(12) United States Patent
Sauer et al.

(10) Patent No.: US 11,402,096 B2
(45) Date of Patent: Aug. 2, 2022

(54) COMBUSTOR DOME VIA ADDITIVE LAYER MANUFACTURING

(71) Applicants: Rolls-Royce Corporation, Indianapolis, IN (US); Rolls-Royce North American Technologies Inc., Indianapolis, IN (US)

(72) Inventors: Kevin Sauer, Plainfield, IN (US); Lewis Dailey, Lebanon, IN (US); Keith McCormick, Indianapolis, IN (US); Duane Smith, Carmel, IN (US); Christopher D. DeBruhl, Indianapolis, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 594 days.

(21) Appl. No.: 16/180,529

(22) Filed: Nov. 5, 2018

(65) Prior Publication Data
US 2020/0141579 A1   May 7, 2020

(51) Int. Cl.
*F23R 3/00* (2006.01)
*B29C 64/153* (2017.01)
(Continued)

(52) U.S. Cl.
CPC ............ *F23R 3/002* (2013.01); *B29C 64/153* (2017.08); *B33Y 10/00* (2014.12); *B33Y 80/00* (2014.12);
(Continued)

(58) Field of Classification Search
CPC ...... F23R 3/06; F23R 3/12; F23R 3/50; F23R 2900/03041–45; F05D 2260/20;
(Continued)

(56) References Cited

U.S. PATENT DOCUMENTS

| 2,811,832 A | 11/1957 | Flanigen et al. |
| 4,302,940 A * | 12/1981 | Meginnis ................ F23R 3/002 60/754 |

(Continued)

FOREIGN PATENT DOCUMENTS

| EP | 3 006 831 A1 | 4/2016 |
| EP | 3 015 648 A1 | 5/2016 |

(Continued)

OTHER PUBLICATIONS

Extended European Search Report, dated Feb. 5, 2020, pp. 1-7, issued in European Patent Application No. 19202152.5, European Patent Office, The Hague, The Netherlands.

(Continued)

*Primary Examiner* — Todd E Manahan
*Assistant Examiner* — Sean V Meiller
(74) *Attorney, Agent, or Firm* — Crowell & Moring LLP

(57) ABSTRACT

A combustor dome may be formed by way of additive layer manufacturing. The combustor dome may further include a raised outer surface and a recessed outer surface on a hot side of the combustor dome. The recessed outer surfaces may be closer to the cold side than the raised outer surfaces. The combustor dome may include a shadow surface defined between the raised outer surface and recessed outer surface. The shadow surface may define a corresponding cooling outlet in fluid communication with an internal cooling channel defined inside of the combustor dome. The cooling outlet may release air from the internal cooling channel to the hot axial side of the combustor dome.

20 Claims, 9 Drawing Sheets

(51) Int. Cl.
    *B33Y 10/00* (2015.01)
    *B33Y 80/00* (2015.01)

(52) U.S. Cl.
    CPC ............... *F23R 2900/00018* (2013.01); *F23R 2900/03042* (2013.01)

(58) Field of Classification Search
    CPC ......... F05D 2260/202; F05D 2260/203; F05D 2260/221
    See application file for complete search history.

(56) References Cited

U.S. PATENT DOCUMENTS

| | | | |
|---|---|---|---|
| 5,307,637 A | 5/1994 | Stickles et al. | |
| 6,155,056 A * | 12/2000 | Sampath | F23R 3/002 60/756 |
| 7,617,689 B2 * | 11/2009 | Schumacher | F02C 7/20 239/399 |
| 8,490,401 B2 * | 7/2013 | Commaret | F23R 3/283 60/753 |
| 9,410,702 B2 | 8/2016 | Dudebout et al. | |
| 9,506,653 B2 * | 11/2016 | Gerendas | F23R 3/60 |
| 9,765,968 B2 * | 9/2017 | Gage | F23R 3/06 |
| 10,731,855 B2 * | 8/2020 | Zelesky | F23R 3/002 |
| 2015/0241064 A1 | 8/2015 | Boardman et al. | |
| 2016/0033129 A1 | 2/2016 | Burd | |
| 2016/0313004 A1 | 10/2016 | Chang et al. | |
| 2016/0313005 A1 | 10/2016 | Chang et al. | |
| 2018/0306114 A1 | 10/2018 | Dudebout et al. | |

FOREIGN PATENT DOCUMENTS

| | | |
|---|---|---|
| GB | 2 053 450 A | 2/1981 |
| GB | 2461897 A | 1/2010 |
| WO | WO 99/63275 | 12/1999 |

OTHER PUBLICATIONS

European Office Action, dated Dec. 15, 2020, pp. 1-6, issued in European Application No. 19202152.5, European Patent Office, Rijswijk, The Netherlands.

* cited by examiner

COMBUSTOR DOME VIA ADDITIVE LAYER MANUFACTURING

This invention was made with government support under contract DTFAWA-14-R-73573 awarded by the Federal Aviation Administration. The government has certain rights in the invention.

TECHNICAL FIELD

This disclosure relates to gas turbine engines and, in particular, to a combustion section for a gas turbine engine.

BACKGROUND

A gas turbine engine may include a combustor section that receives fuel and air for combustion. Assembly of the combustor section may involve mechanically coupling components together by way of fasteners, welding, brazing, or other attachment techniques. In some examples, the components of the combustor section may control flows of air and/or fuel through the combustion section. For example a swirler may mix fuel and air for combustion. The heat generated by combustion may apply thermal stresses to the various components of the combustor section. Heat shields positioned in the combustor section may dissipate the heat. The heat shields, or other components, may include various cooling features, such as cooling holes, that are defined by removing portions of the material from the heat shield by way of drilling, punching, or other manufacturing techniques.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
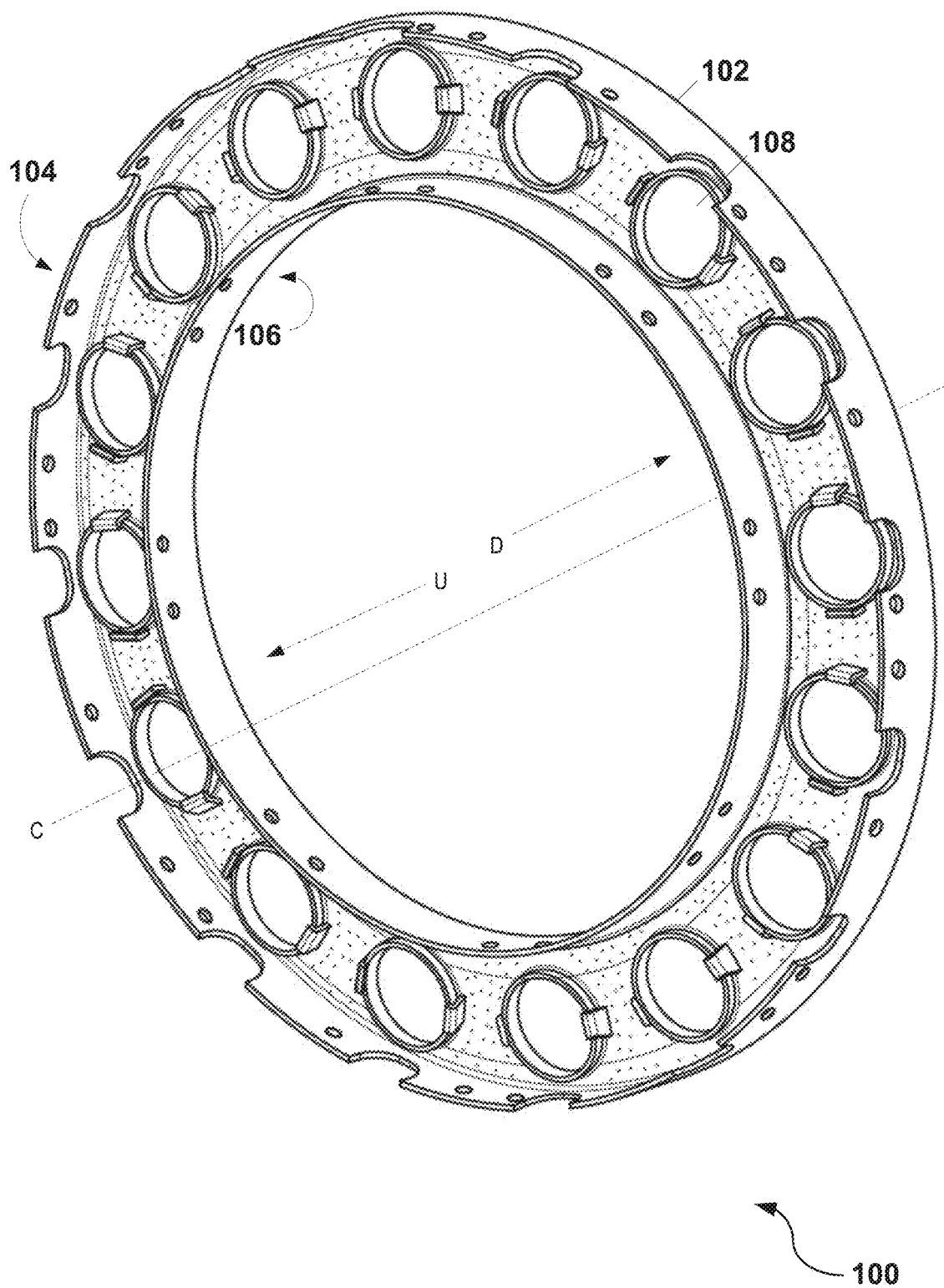
FIG. 1 illustrates a perspective view of a combustor system.

By way of an introductory example, an annular combustor dome arranged around a flow path for a gas turbine engine may include a first axial side and a second axial side. The first axial side may be upstream from the second axial side, relative to the flow path. The combustor dome may define a plurality of injection holes that extend from the first axial side to the second axial side. The injection holes may fluidly communicate with a combustion chamber at least partially defined by the second axial side of the combustor dome.

The combustor dome may further include a raised outer surface and a plurality of recessed outer surfaces on the second axial side of the combustor dome. The recessed outer surfaces may be closer to the first axial side than the raised outer surfaces. The combustor dome may include a plurality of shadow surfaces defined between the raised outer surface and recessed outer surfaces, respectively. Each of the shadow surfaces may define a corresponding cooling outlet in fluid communication with an internal cooling channel inside of the combustor dome. The corresponding cooling outlet may release air from the internal cooling channel to the second axial side of the combustor dome.

One technical advancement of the system and methods described herein may be that a swirler retainer, a heat shield, cooling features, and/or other portions of the combustor dome may be integrated into a single component by way of Additive Layer Manufacture (ALM). Integrating the swirler, the heat shield, and/or the cooling features may reduce complexity of combustor assembly and/or provide a weight reduction. Alternatively or in addition, forming the combustor dome layer by layer may eliminate or minimize removal of hardened material to define holes, channels, or other features on the combustor dome.

Alternatively or in addition, a technical advancement achieved by the system and methods described herein may be that the combustor dome may include cooling schemes that can by feasible manufactured by ALM. The cooling schemes may include complex cooling channels that improve thermal dissipation, thereby improving life spans of the combustor dome and components in neighboring regions. For example, the cooling channels may include bends, curves, and/or intersections that are difficult or impossible to manufacture through traditional manufacturing techniques. Improved cooling of the combustor dome may negate attachment of a separate heatshield to the combustor dome.

Alternatively or in addition, a technical advancement achieved by the systems and methods described herein may be that the combustor dome may be integrated with features, such as pockets and hoods, to shield cooling holes during thermal barrier coating application. For example, a thermal barrier coating may be applied to the hot side of the combustor dome. The holes may recessed or covered by portions of the combustor dome prevent clogging or covering the cooling holes. Additional and alternative technical advancements are made evident in the systems and methods described herein.

FIG. 1 illustrates a perspective view of a combustor system 100. The combustor system 100 may include a combustor dome 102. The combustor dome 102 may include an annular or semi-annular body arranged around a centerline C for a gas turbine engine (see FIG. 10 for an example of a gas turbine engine). Alternatively, the combustor dome 102 may include an array of can-annular bodies arranged around the centerline C. The combustor dome 102 may at least partially define a combustion chamber downstream from the combustor dome 102, relative to a downstream direction D. (see FIG. 11 for an example of a combustion chamber). The combustor dome 102 may include a first axial side 104 and a second axial side 106. The first axial side 104 of the combustor dome 102 may be upstream from the second axial side 106 relative to an upstream direction U. The second axial side 106 may at least partially define the combustion chamber.

The combustor dome 102 may be formed via ALM. ALM may include a manufacturing technique in which a three dimensional component is formed by successively adding new layers of material to previous layers of solidified material. For example, ALM may include powder bed fusion. Powder bed fusion may include a type of ALM in which an energy beam, such as a laser or electron beam, heats portions of a bed of power. The heated powder is melted and then hardened in place after cooling. A new layer of powder is added to previously hardened layer(s), and the laser heats the new layer of powder. The three-dimensional component is formed by repeatedly adding powder to previously hardened layers and then heating the powder to form new hardened layers.

Alternatively or in addition, the combustor dome 102 may be formed by other types of ALM. For example, another type of ALM suitable for forming the combustor dome 102 may include electron beam melting. Electron beam melting is similar to laser powder bed fusion, except an electron beam is used in place of the laser to directly melt the powder.

Forming the combustor dome 102 via ALM may enable the combustor dome 102 to include structural features that are integral to the combustor dome 102, without mechanically attaching the structural feature to the combustor dome 102. For example, forming successive layers into a unitary combustor dome, features of the combustor dome 102 may be integrated without fastening, welding, and/or attaching the features to the dome. In some examples, these features may reduce and/or eliminate the need to perform certain coupling steps during assembly of the combustor dome 102, a combustor, and/or a gas turbine engine.

Alternatively or in addition, the combustor dome 102 may include complex cooling features that are defined by the combustor dome 102. For example, heat dissipation provided by the complex cooling features may negate inclusion of a heat shield on the second axial side 106 of the combustor dome 102. For example, the combustor dome 102 may at least partially define the combustion chamber without a heat shield coupled to the second axial side 106 of the combustor dome 102. Alternatively or in addition, the heat shield may be integral to the combustor dome 102 such that at least a portion of the combustor dome 102 includes the heat shield. Examples of the complex cooling features formed via ALM are exemplified in FIGS. 3-9.

Figure 2:
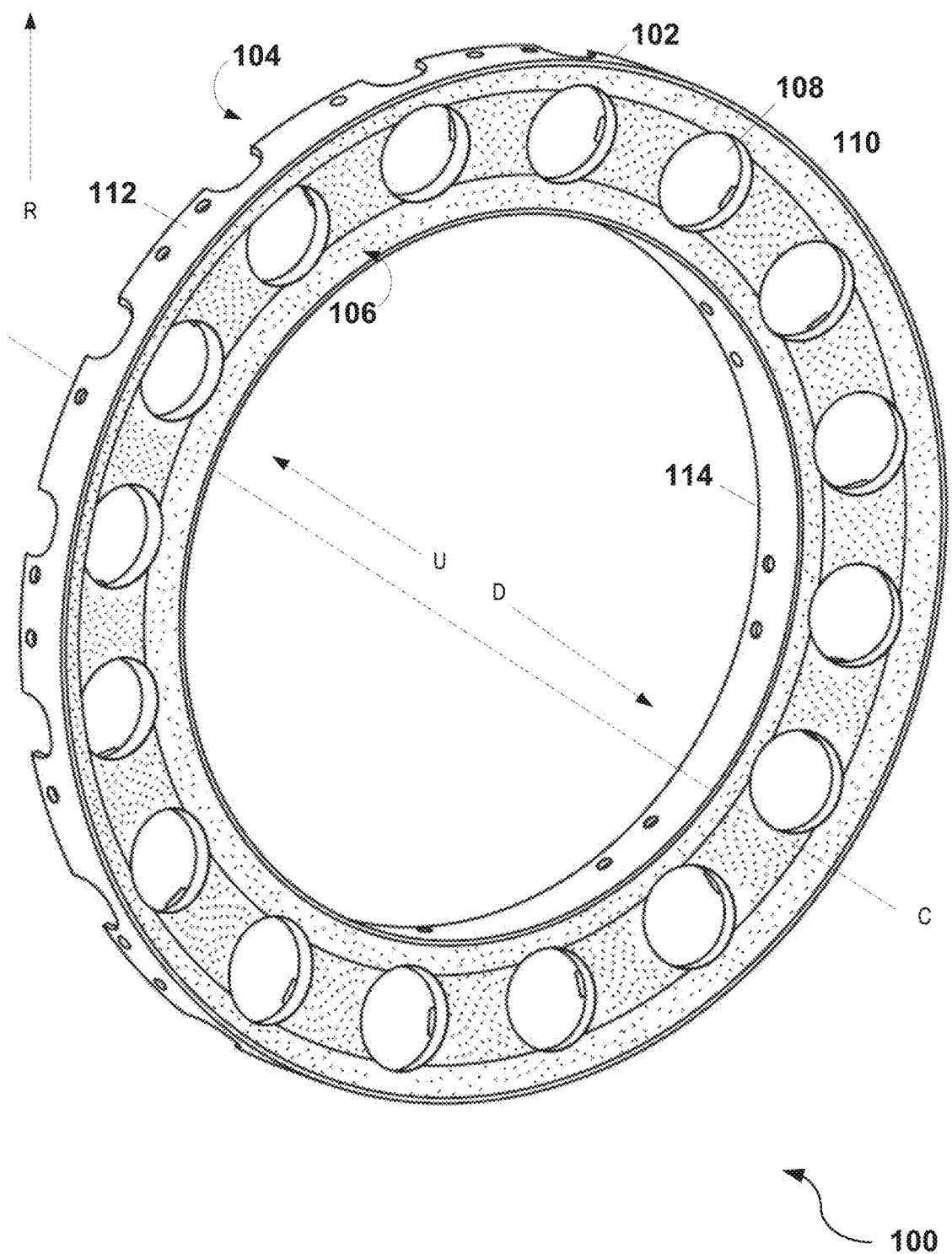
FIG. 2 illustrates a second perspective view of a combustor system.

FIG. 2 illustrates a second perspective view of the combustor system 100. The combustor dome 102 may include an injection hole 108, or multiple injection holes. The injection hole 108 may extend though the combustor dome 102, from the first axial side 104 to the second axial side 106. A fuel injector and/or swirler may be positioned within or proximate to the injection hole 108. The combustion chamber may receive fuel, air, and/or an air/fuel mixture from the injection holes, swirlers, and/or fuel injectors (see FIG. 11 for an example of a combustion chamber and a fuel injector).

In some examples, the combustor dome 102 may include a dome plate 110. The dome plate 110 may be defined radially between a first radial surface 112 and a second radial surface 114. The first radial surface 112 may be positioned radially outer ward from the second radial surface 114, relative to the centerline C. Alternatively or in addition, the dome plate 110 may extend along the radial direction R from the second radial surface 114 to the first radial surface 112. The radial direction R may extend radially outward from the centerline C. The dome plate 110 may define the injection hole 108, or other injection holes included in the combustor dome 102.

By way of ALM, the combustor dome 102 may be formed as a unitary structure. The injection hole 108, or injection holes, may be formed without coupling additional components to the combustor dome 102 or removing hardened material from the combustor dome 102. For example, multiple layers of the dome may be successively added together to define the injection holes. In some examples, powder may be melted with a heat source, such as a laser. The heat source may melt the powder in areas around the injection holes without melting the powder where the injection holes are located. Cooling the melted powder may form new hardened layers of the combustor dome 102 that define at least one of the injection holes. Removing the unmelted powder from the combustor dome 102 may reveal the injection holes.

Figure 3:
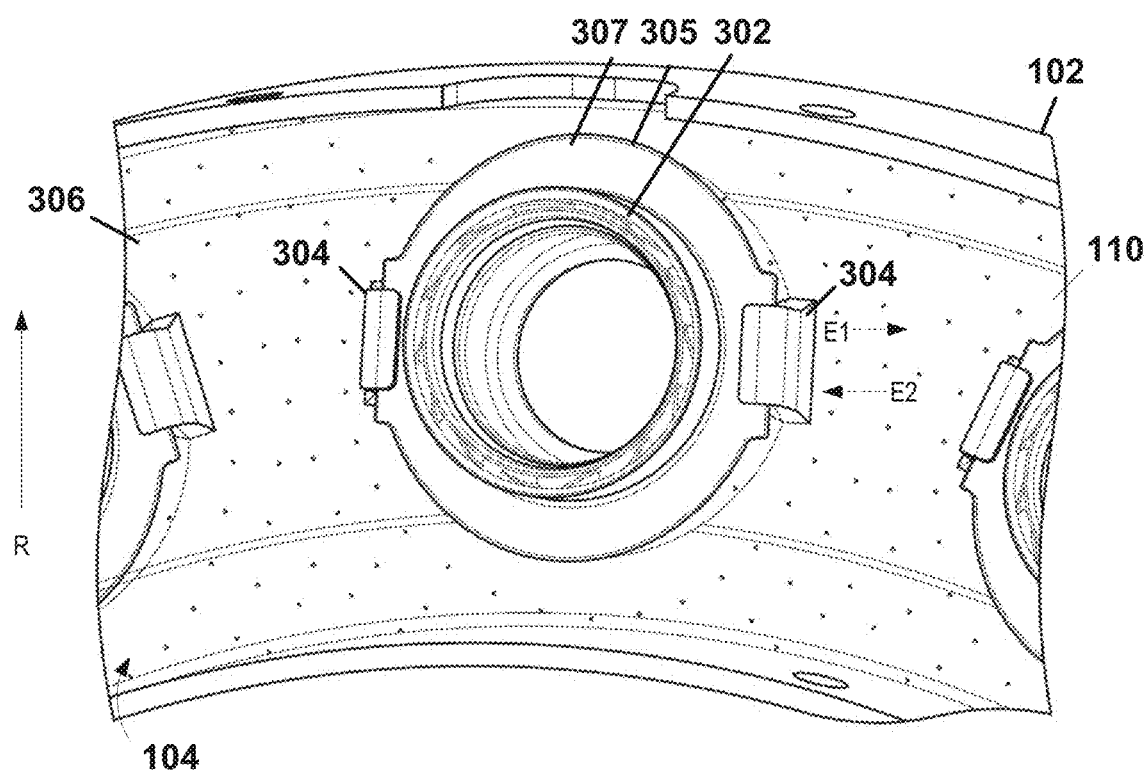
FIG. 3 illustrates a first perspective view of a combustor dome.

FIG. 3 illustrates a first perspective view of the combustor dome 102 (a portion of the combustor dome 102 visible in FIG. 3). The system 100 may include a swirler 302. The swirler 302 may include one or more mixing passages that convey air and fuel to the combustion chamber. In some examples, the swirler 302 may be a separate and distinct component from the combustor dome 102. For example, the swirler 302 may be inserted into the injection hole 108.

The combustor dome 102 may include a retainer 304 that retains the swirler 302 in the injection hole 108. The retainer 304 may be integral to the dome plate 110. For example, the retainer 304 may include a portion of the combustor dome 102 that extends away from the dome plate 110. Alternatively or in addition, the swirler may extend over the injection hole 108. In some examples, the retainer 304 may be positioned adjacent to the injection hole 108 and/or the swirler 302. Alternatively or in addition, multiple retainers may be positioned adjacent to the injection hole 108. Positioning the retainer 304 adjacent to the injection hole 108 may include, for example, positioning the retainer along or near the perimeter of the injection hole on the first side 104 of the combustor dome 102.

The retainer 304 may be integral to the combustor dome 102. For example, the retainer 304 may be formed as a portion of the combustor dome 102 via ALM. The retainer 304 may be included on the combustor dome 102 without adding or fixing, welding, or attaching a separate retainer to a separate combustor dome.

In some examples, it may be desirable to allow the swirler 302 to move within the injection hole 108. For example, free movement of the swirler may ensure that thermal expansion and contraction of the combustor dome 102 does not damage the swirler 302 or fuel spray nozzle 1110. Alternatively or in addition, the retainer 302 may ease replacement of the swirler 302 over the life span of the gas turbine engine. The retainer 304 may retain the swirler 302 within the injection hole 108 without fastening, welding, or brazing the swirler 302 to the retainer 304 and/or combustor dome 102. The retainer 304 may move or bend so that the injection hole 108 can receive the swirler 302. After the swirler 302 is inserted into the injection hole 108, the retainer 304 may move back to retain the swirler 302 within the injection hole 108. For example, the retainer 304 may move and/or bend away from the injection hole 108 along a first direction E1 and then back toward the injection hole 108 along a second direction E2. In some examples, the retainer 304 may include elasticity that allows the retainer 304 to spring back to an original portion after force is applied to the retainer 304. Alternatively or in addition, the retainer 304 may be fastened, welded, friction fit, and/or attached to the swirler 302 after the swirler 302 is positioned in the injection hole 108.

In some examples, the swirler 302 may include a retention lip 305. The retention lip 305 may include a portion of the swirler 302 that is retained against the combustor dome 102. The retention lip 305 may include an outer surface 307. The retainer 304 may be positioned over and/or contact the outer surface 307 of the retainer 304. For example, at least a portion of the retainer 304 may be positioned upstream from the outer surface 307 of the retention lip 305.

The retention lip 305 may include an inner surface that is opposite the outer surface 307. For example, the inner surface may be positioned downstream from the outer surface 307, relative flow direction of the swirler 302 and/or the centerline C of the gas turbine engine. The inner surface of the retention lip 305 may abut an outer surface of the combustor dome 102. For example, the injection hole 108 may receive the swirler 302 on the first axial side 104 of the combustor dome 102. The retention lip 305 may abut the first axial side 104 of the combustor dome 102. The retainer 304 may be moved or adjusted to overlap the outer surface 307 of the retention lip 305 to retain the swirler 302 in the injection hole 108. For example, at least a portion of the retainer 304 may be positioned upstream from the outer surface 307 of the retention lip 305.

The combustor dome 102 may include a cooling inlet 306, or a plurality of cooling inlets, on first axial side 104 of the combustor dome 102. The cooling inlets may receive air from the first axial side 104 of the combustor dome 102 and convey the air toward the second axial side 106 of the combustor dome 102. Alternatively or in addition, the cooling inlets may fluidly communicate with one or more cooling channels defined internally in the combustor dome 102 and/or dome plate 110.

The cooling inlet 306, or inlets, may be formed in the combustor dome 102 without coupling additional components to the combustor dome 102 or removing hardened material from the combustor dome 102. For example, multiple layers of the dome may be successively added together to define the inlets. In some examples, powder may be melted with a heat source, such as a laser or energy beam. The heat source may melt the powder in areas around the inlets without melting the powder where the inlets are located. Cooling the melted powder may form new hardened layers of the combustor dome 102 that define the inlets. Removing the unmelted powder from the combustor dome 102 may reveal the inlets.

Figure 4:
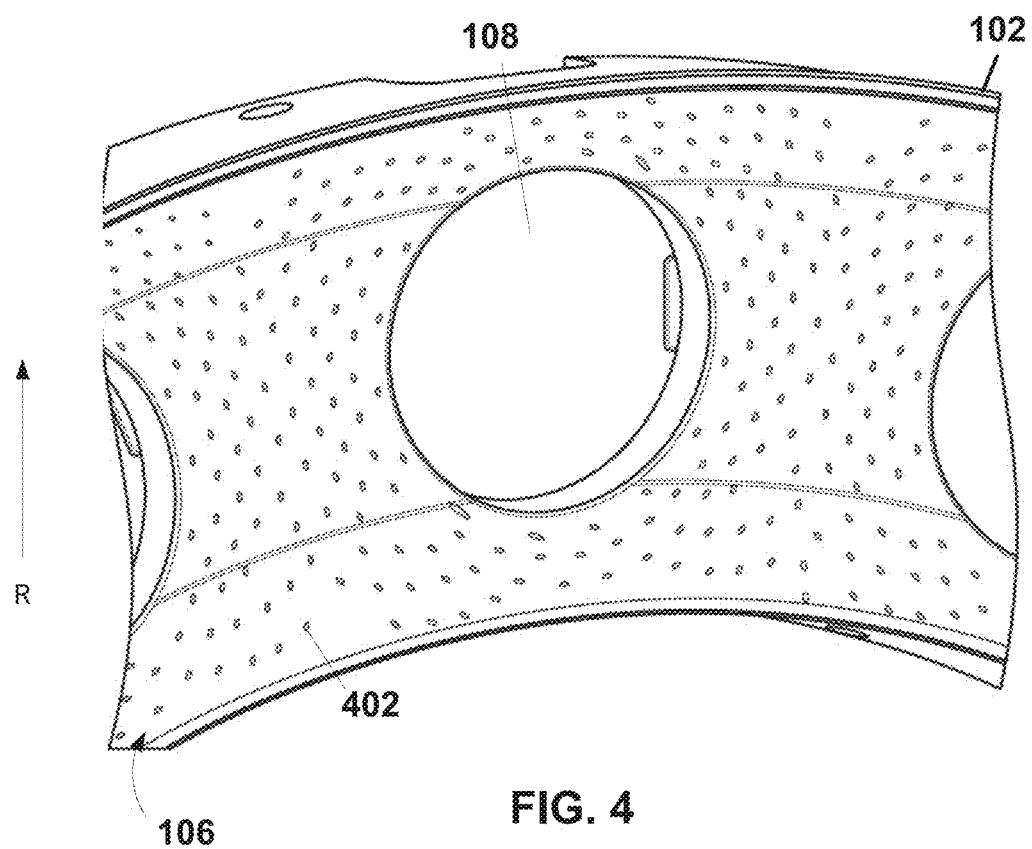
FIG. 4 illustrates a second perspective view of a combustor dome.

FIG. 4 illustrates a second perspective view of the combustor dome 102 (only a portion of the combustor dome 102 is visible in FIG. 4). The combustor dome 102 may include a cooling outlet 402, or a plurality of cooling outlets, on the second axial side 106 of the combustor dome 102. The cooling outlets 402 may release air received from the first axial side 104 of the combustor dome 102. For example, the cooling outlets may fluidly communicate with the inlets on the first axial side 104 of the combustor dome 102. Alternatively or in addition, the cooling outlets may receive air from passages internal to the combustor dome 102. During operation, air released by the holes may be hot due to thermal exchange with the combustor dome 102. The cooling outlets may release the hot air on the second axial side 106 of the combustor dome 102. Alternatively or in addition, the cooling outlets may provide film cooling to the second axial side 106 of the combustor dome 102.

The cooling outlet 402, or outlets, may be formed in the combustor dome 102 without coupling additional components to the combustor dome 102 or removing hardened material from the combustor dome 102. For example, multiple layers of the dome may be successively added together to define the cooling outlet 402. In some examples, powder may be melted with a heat source, such as a laser. The heat source may melt the powder in areas around the cooling outlet 402 without melting the powder where the cooling outlet 402 is located. Cooling the melted powder may form new hardened layers of the combustor dome 102 that define the cooling outlet 402. Removing the unmelted powder from the combustor dome 102 may reveal the cooling outlet 402.

FIG. 5A-B illustrates a third example of the combustor system 100. A portion of the combustor dome 102 is visible in FIG. 5A. The combustor dome 102 may include an internal cooling channels 502. An internal cooling channel may include a passageway defined by the combustor dome 102 to convey air and/or cool the combustor dome 102. For example, the internal cooling channel may receive air from one or more inlet 306 and convey the air from the inlet 306 to one or more outlet 402.

The internal cooling channels 502 may be defined within between the first axial side 104 and the second axial side 106 of the combustor. The internal cooling channels 502 may be connected together to form a grid of intersecting cooling channels. Each of the internal cooling channels may be include a passage that extends between intersections.

In some examples, the internal cooling channels 502 may include a circumferential cooling channel 504 and radial cooling channel 506. The circumferential cooling channel 504 may include a passageway that is concentric with the injection hole 108. The combustor dome 102 may include a plurality of circumferential cooling channels. Each circumferential cooling channel may be positioned at a different radial distance from the injection hole 108.

The radial cooling channel 506 may include a passageway that extends radially away from the injection hole 108. The combustor dome 102 may include multiple radial cooling channels arranged around the injection hole 108. One or more radial cooling channel may intersect one or more circumferential cooling channel.

The internal cooling channels 502, such as the circumferential cooling channel 504 and the radial cooling channel 506, may be formed in the combustor dome 102 without coupling additional components to the combustor dome 102 or removing hardened material from the combustor dome 102. For example, a heat source, such as a laser or electron beam, may successively heat and harden new layers of power to form of the combustor dome 102. The laser may heat the powder in areas around the internal cooling channels 502 without heating powder along the internal cooling channels 502.

As illustrated in FIG. 5B, the cooling inlet 306 may convey air to an circumferential cooling channel 402. The air flowing from the inlet may impinge an internal surface of the dome plate 110, thereby cooling the dome plate. For example, the inlet 306 may impinge air onto an intersection of the radial cooling channel 506 and the circumferential cooling channel 504. In some examples, the inlet may release air to a channel or passageway that extends to intersection. The air may be divided between the radial cooling channel 506 and the circumferential cooling channel 504. The air may flow along the circumferential cooling channel 504 to the outlet 402. The outlet may fluidly communicate with the circumferential cooling channel. For example, a passageway or channel may extend to the outlet from the passageway. The outlet 402 may release the air.

In other examples, the combustor dome 102 may include other types and arrangements of the internal cooling channels 502. The inlet may fluidly communication with one or multiple internal cooling channels. The outlets may fluidly communicate with one or multiple internal cooling channels. Alternatively or in addition, the outer 402 may receive air directly from the inlet 306.

In some examples, the combustor dome 102 may include various cooling features along the second axial side of the combustor dome. The cooling features may be integral to the combustor dome. For example, the cooling features may be formed through ALM.

Figure 6:
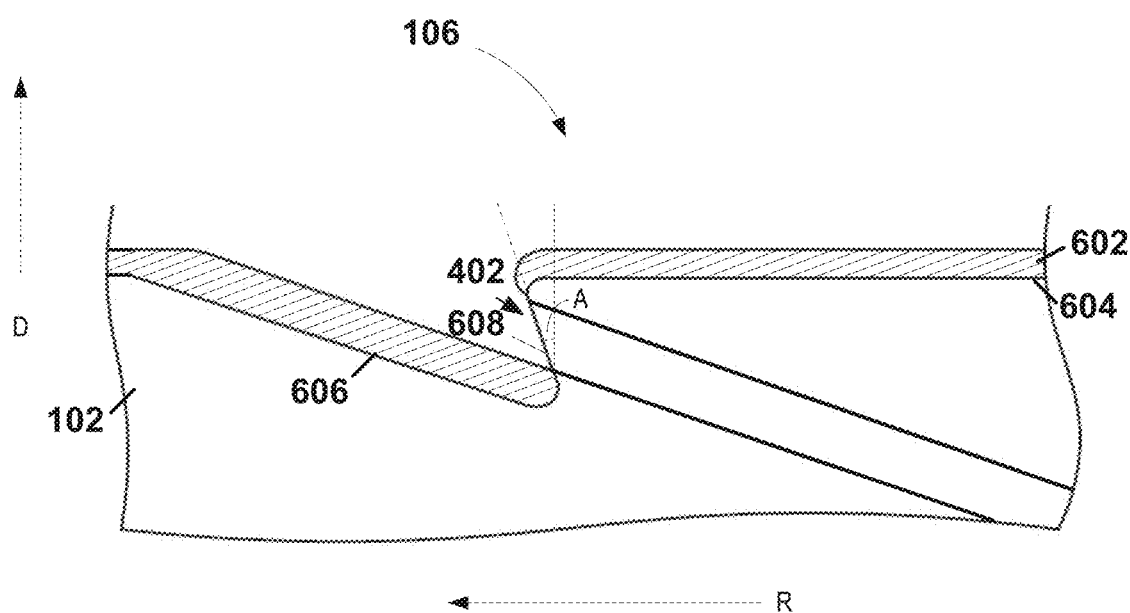
FIG. 6 illustrates a side view of an second example of a combustor dome.

FIG. 6 illustrates a side view of a second example of the combustor dome 102 (a portion of the second axial side 106 is shown in FIG. 6). In some examples, the second axial side 106 of the combustor dome 102 may receive a thermal barrier coating 602. The thermal barrier coating 602 may insulate the combustor dome 102 from the heat generated in the combustor chamber. The thermal barrier coating 602 may be applied to the combustor dome 102 after the combustor dome 102 is formed. For example, the thermal barrier coating 602 may be applied by spraying, for example plasma spraying, the second axial side 106 of the combustor dome 102 with the coating. In other examples, the thermal barrier coating 602 may be applied by other techniques. The outlet 402 may be shielded to avoid being clogged or covered by the thermal barrier coating 602. For example, the combustor dome 102 to define the outlet 402 in a recessed or cowled region of the combustor dome 102.

The thermal barrier coating may include a coating second side 106 of the combustor dome 102, which insulates the combustor dome 106 from elevated temperatures. The thermal barrier coating 602 may include one or more insulation layers. In some examples, the thermal barrier coating 602 may include a plasma sprayed yttria-stabilized zirconium oxide powder. Alternatively or in addition, the thermal barrier coating 602 may include any coating applied to the combustor dome 102 that is designed to impede heat from being transferred to the combustor dome 102.

The combustor dome 102 may include an outer surface 604, 606. The outer surface 604, 606 of the combustor dome 102 may include a raised outer surface 604 and recessed outer surface 606 on the second axial side 106 of the combustor dome 102. For example, the raised outer surface 604 may be axially offset from the recessed outer surface 606. The raised outer surface 604 may be downstream from the recessed outer surface 606, relative to the downstream direction D. Alternatively or in addition, the raised outer surface 604 may be closer to the first axial side 104 of the combustor dome 102 than the recessed outer surface 606.

The raised outer surface 604 and the recessed outer surface 606 may define a shadow surface 608. The shadow surface 608 may be defined between the raised outer surface 604 and the recessed outer surface 606. The shadow surface 608 may at least partially define the outlet 402. For example, shadow surface 608 may include a flat wall and/or a tapered surface, such as a fillet. In some examples, the shadow surface 608, or a portion thereof, may be angled with respect to the raised outer surface 604. For example, the shadow surface 608 may angled with a shadow angle A. The shadow angle A may include an acute angle between the shadow surface 608 and a line perpendicular or tangential to the raised outer surface 604. For example, the shadow surface 608 may be angled with respect to the raised outer surface 604 such that the raised outer surface 604 extends over or overhangs, the recessed outer surface 606. The raised outer surface 604 may overhang the cooling outlet 306 from receiving thermal barrier coating applied to the second axial side 106 of the combustor dome 102.

Figure 7:
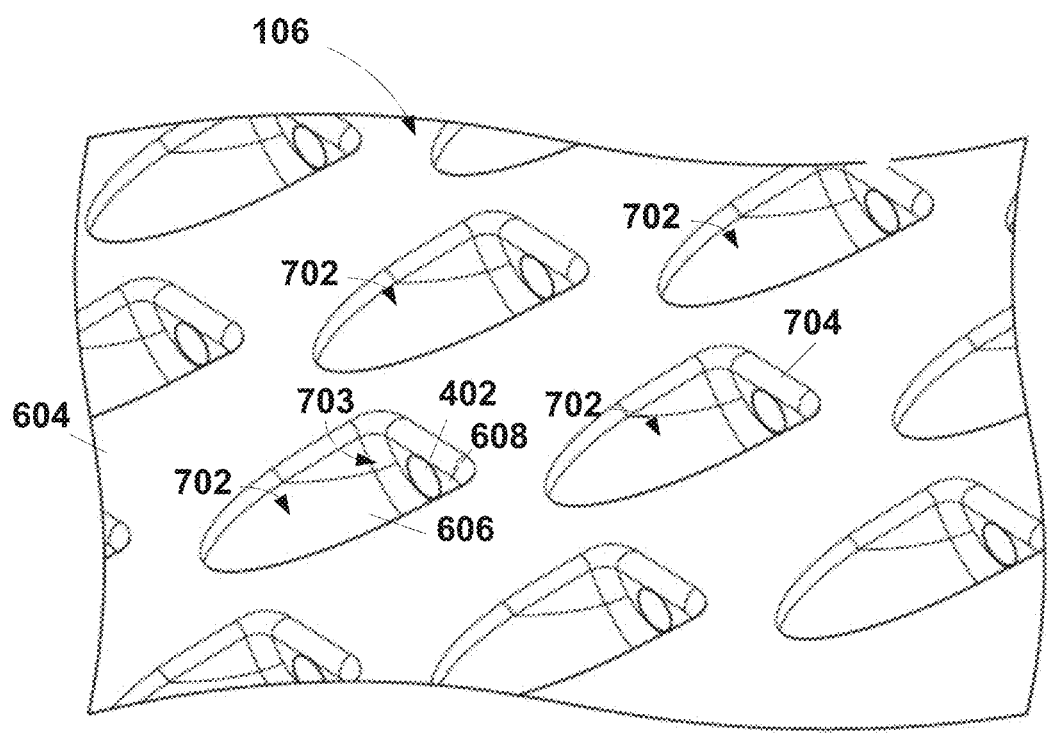
FIG. 7 illustrates a perspective view of a second example of a combustor dome.

FIG. 7 illustrates a perspective view of a second example of the combustor dome 102. The combustor dome 102 may include a pocket 702, or multiple pockets. A pocket 702 may include a recess along the outer surface of the combustor dome 102. The pocket may include a scoop shape. Alternatively or in addition, the pocket may include any additional shape. The outlet 402 may be positioned in the pocket 702 and/or along a sidewall of the pocket 702. The pocket 702 may shield the outlet 402 for thermal barrier coating 602 applied to the second axial side 106 of the combustor dome 102.

The combustor dome 102 may include a plurality of pockets located on the second axial side 106 of the dome plate 110. Each of the pockets may include a side 703 having the shadow surface 608. The shadow surface may include the cooling outlet 402 in fluid communication with the internal cooling channel 502. The cooling outlet 402 may release air from the internal cooling channel 502 onto the second axial side 106 of the dome plate 110.

The recessed outer surface 606 and the shadow surface 608 may at least partially define the pocket 702. The raised outer surface 604 may include an outer surface of the combustor dome 102 between multiple pockets. The raised outer surface 604 and the recessed outer surface 606 may define the shadow surface 608.

In some examples, the pocket may include an overhang 704. The overhang 704 may include a portion of the raised outer surface 604. For example, the raised outer surface 604 may extend over the recessed surface included in the pocket. The overhang may include the portion of the raised outer surface 704 that extends over the recessed surface.

The pocket 702, or pockets, may be formed in the combustor dome 102 without coupling additional components to the combustor dome 102 or removing hardened material from the combustor dome 102. For example, multiple layers of the dome may be successively added together to define the pocket 702. In some examples, powder may be melted with a heat source, such as a laser. The heat source may melt the powder in areas around the pocket 702 without melting the powder where the pocket 702 is located. Cooling the melted powder may form new hardened layers of the combustor dome 102 that define the pocket 702. Removing the unmelted powder from the combustor dome 102 may reveal the pocket 702.

Figure 8:
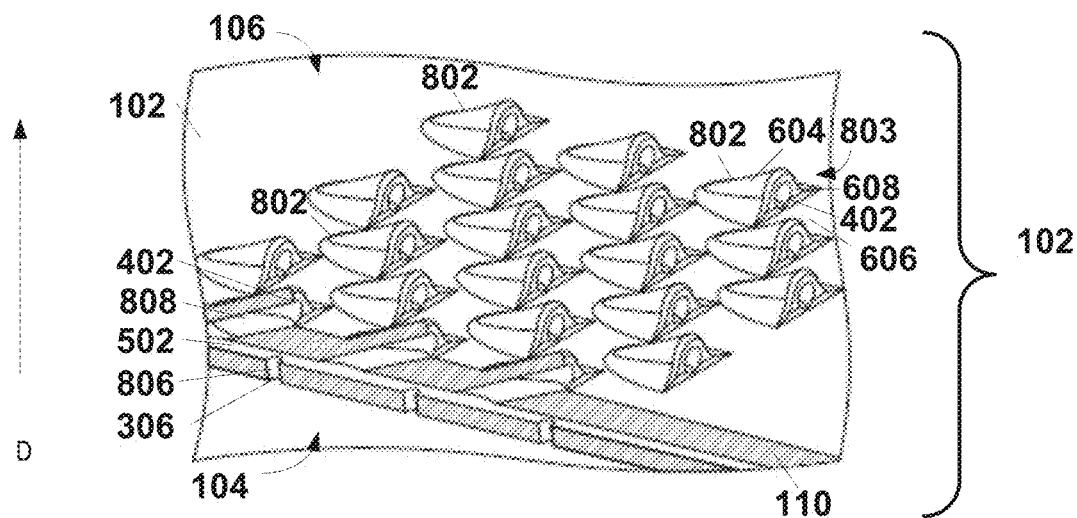
FIG. 8 illustrates a perspective view of a third example of a combustor dome.

FIG. 8 illustrates a perspective view of a third example of the combustor dome 102. The combustor dome may include a plurality of raised hoods 802 located on the second axial side of the annular dome plate. Each of the raised hoods 802 may include a side 803 having the shadow surface 608. The shadow surface may include the cooling outlet 402. The cooling outlet may be in fluid communication with the internal cooling channel 502. The cooling outlet may release air from the internal cooling channel 502 onto the second axial side 106 of the dome plate 110.

Alternatively or in addition, at least one of the raised hoods 802 may include a raised portion of the combustor dome 102 on the outer surface of the combustor dome 102. For example, the hood 802 may extend away from the dome plate 110. Alternatively or in addition, the hood 802 may extend into the combustion chamber. The hood 802 may be integral to the dome plate 110.

The hood 802 may include the outlet 402. The hood 802 may shield the outlet 402 from being clogged or covered with a thermal barrier coating applied to the second axial side 106 of the combustor dome 102 (thermal barrier coating not visible in FIG. 8). For example the hood 802 may include a cowl for the outlet 402.

The hood 802 may include the raised outer surface 604 and the shadow surface 608. The recessed outer surface 606 may be defined between multiple hoods. The shadow surface 608 may be defined between the raised outer surface 604 and the recessed outer surface 606. The shadow surface 608 may at least partially define the outlet 402. For example the outlet 402 may extend through the shadow surface 608 and release air along the recessed outer surface 606.

The combustor dome 102 may include an inlet channel 806, or multiple inlet channels. The inlet channel 806 may extend along the downstream direction D and/or away from the first axial side 104 of the combustor dome 102. The inlet channel 806 may convey air from the first axial side 104 of the combustor dome 102 to at least one of the internal cooling channels 502.

The combustor dome 102 may include an outlet channel 808 or multiple outlet channels. The outlet channel 808 may extend along the downstream direction D, and/or away from the first axial side 104 of the combustor dome 102. The outlet channel may convey air from at least one of the internal cooling channels 502 to the outlet 402. In some examples, the hood 802 may define at least a portion of the outlet channel 808. Alternatively or in addition, the outlet channel 808 may be defined by the dome plate 110. In other examples, the outlet channel 808 may convey air to one or more pockets (FIG. 7 illustrates an example of the pockets).

During operation, the inlet 306 may receive air from the first axial side 104 of the combustor dome 102. The inlet channel 806 may convey along the upstream direction to at least one of the internal cooling channels 502. The internal cooling channel(s) 502 may convey to the outlet channel 808. The outlet channel 808 may convey the air to the outlet 402. The hood 802 may convey the air to the outlet 402. The outlet 402 may convey the air to the second axial side 106 of the combustor dome 102 and/or into the combustion chamber.

Figure 9:
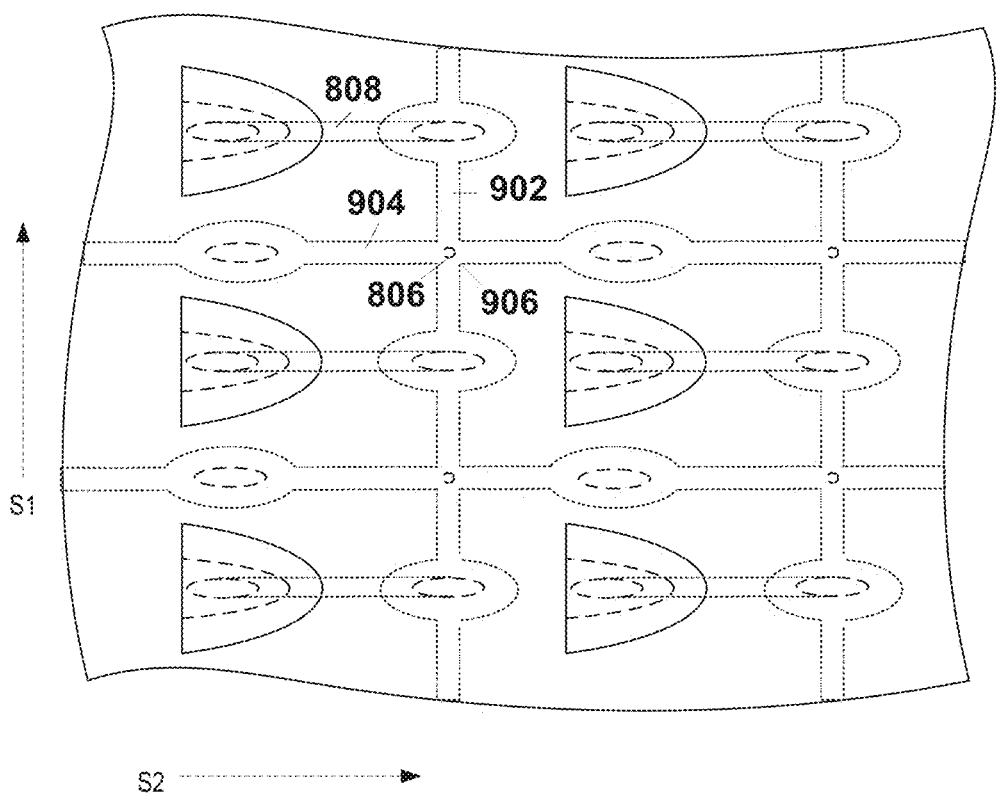
FIG. 9 illustrates a side view of a third example of a combustor dome.

FIG. 9 illustrates a side view of a third example of the combustor dome 102. A portion of the second axial side 106 of the combustor dome 102 is visible in FIG. 9. The internal cooling channels 502, inlet channel 806 and outlet channel 808 are marked with dashed lines.

In some examples, the internal cooling channels 502 may include a first cooling channel 902 and/or a second cooling channel 904. The first cooling channel 902 may be oriented along a first direction S1. The second channel 904 may be oriented along a second direction S2. The first cooling channel 902 and the second cooling channel 904 may intersect at a channel junction 906. The channel junction 906 may receive air from the inlet channel 806. The air may split between the first cooling channel 902 and the second cooling channel 904. The combustor dome 102 may include multiple channel junctions where first cooling channels and second cooling channels respectively intersect. The outlet channel 808 may intersect or connect to cooling channel in between the channel junctions. For example, air flowing along an internal cooling channel may exit the internal cooling channels via the outlet channel 808. The outlet channel 808 may receive air from the cooling channel in between at least two channel junctions.

Figure 5:
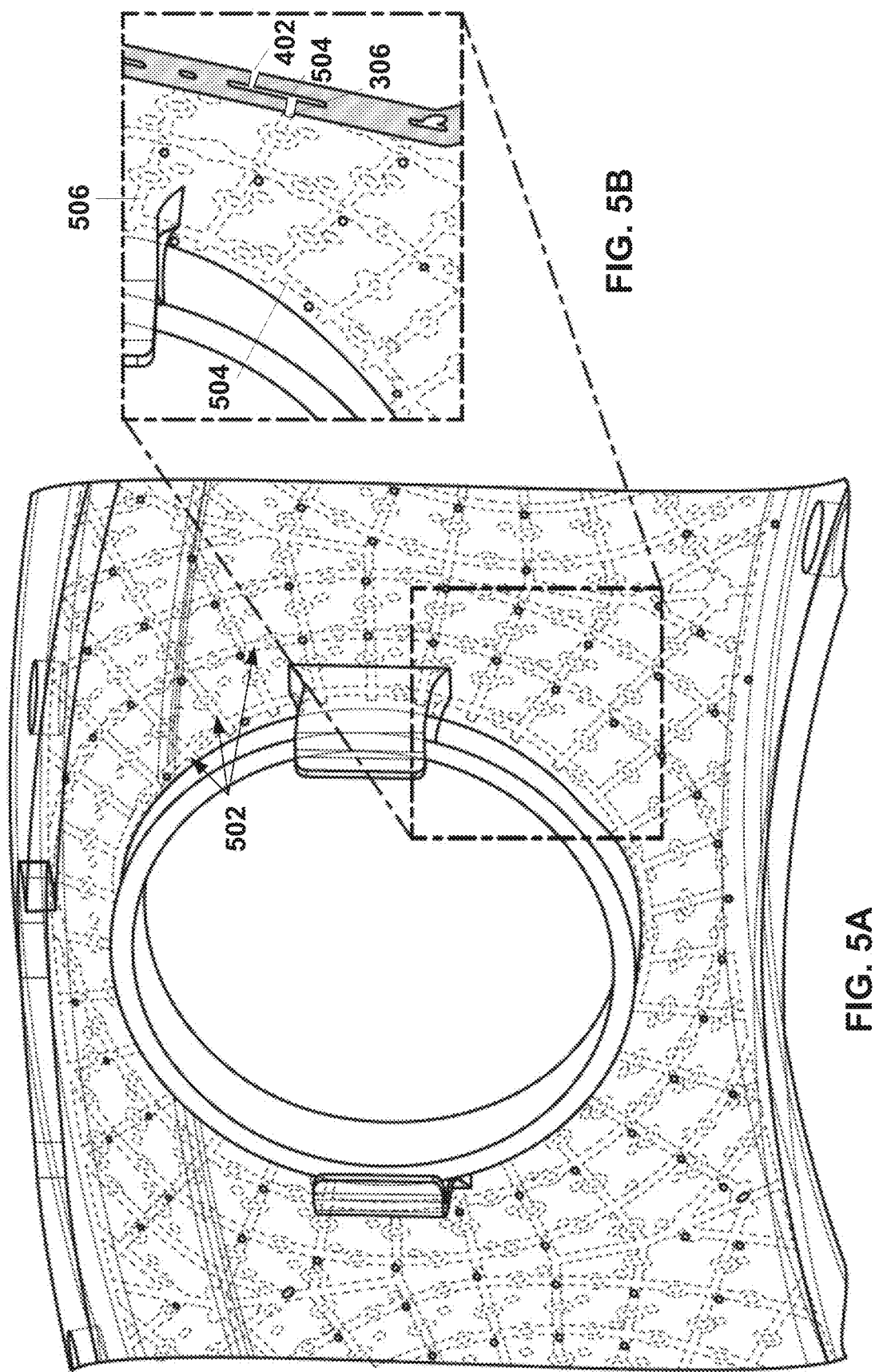
FIG. 5A-B illustrates a third example of a combustor system.

In some examples, the first direction S1 may be a circumferential line that is concentric with the injection hole 108, and the second direction S2 may include a line that extends radially from the injection hole 108 (see, for example, the radial cooling channel and the circumferential cooling channel illustrated in FIG. 5). In other examples, the first direction S1 and the second direction S2 may include any intersecting directions along a radial plane that intersects the centerline C of the gas turbine engine.

The internal cooling channels 502, junctions, inlets channels, outlet channels, inlets, and/or outlets, may be formed in the combustor dome 102 without coupling additional components to the combustor dome 102 or removing hardened material from the combustor dome 102. For example, a heat source, such as a laser, may successively heat and harden new layers of power to form of the combustor dome 102. The laser may heat the powder in areas around the internal cooling channels 502, junctions, inlets channels, outlet channels, inlets, and/or and/outlets, without heating and hardening the powder where the internal cooling channels, junctions, inlets, and/or outlets are located.

Figure 10:
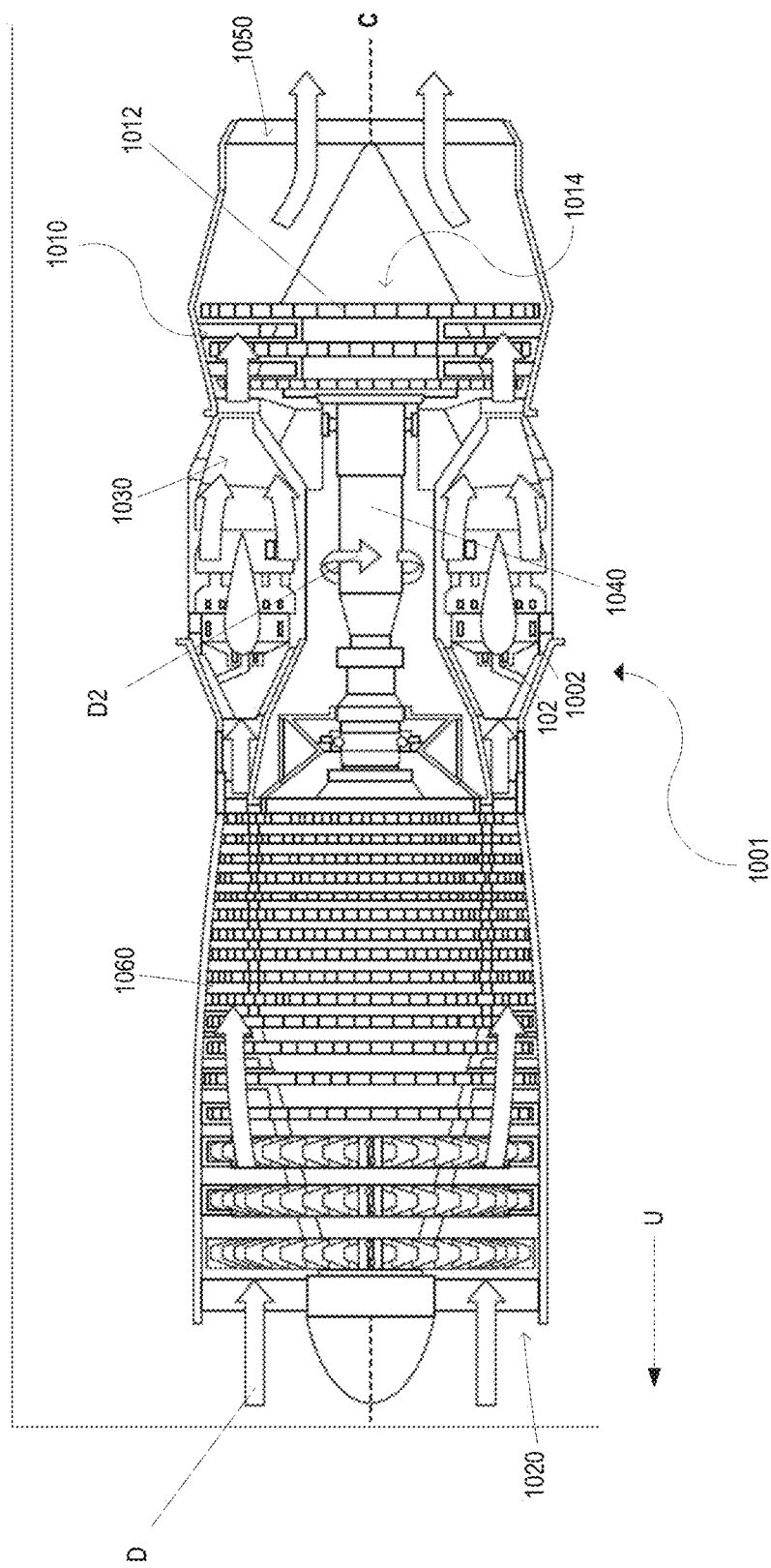
FIG. 10 illustrates a cross-sectional view of a gas turbine engine.

FIG. 10 is a cross-sectional view of a gas turbine engine 1001. In some examples, the gas turbine engine 1001 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne vehicle. Alternatively or in addition, the gas turbine engine 1001 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 1001 may take a variety of forms in various embodiments. Though depicted as an axial flow engine, in some forms the gas turbine engine 1001 may have multiple spools and/or may be a centrifugal or mixed centrifugal/axial flow engine. In some forms, the gas turbine engine 1001 may be a turboprop, a turbofan, or a turboshaft engine. Furthermore, the gas turbine engine 1001 may be an adaptive cycle and/or variable cycle engine. Other variations are also contemplated.

The gas turbine engine 1001 may include an intake section 1020, a compressor section 1060, a combustion section 1030, a turbine section 1010, and an exhaust section 1050. During operation of the gas turbine engine 100, fluid received from the intake section 1020, such as air, travels along the downstream direction D and may be compressed within the compressor section 1060. The compressed fluid may then be mixed with fuel and the mixture may be burned in the combustion section 1030. The combustion section 1030 may include any suitable fuel injection and combustion mechanisms. For example, the combustion section 1030 may include the combustor dome 102. During manufacturing, the combustor dome 102 may be formed as a unitary structure via ALM. The combustor dome 102 may couple with components of the gas turbine engine.

The hot, high pressure fluid may then pass through the turbine section 1010 to extract energy from the fluid and cause a turbine shaft of a turbine 1014 in the turbine section 1010 to rotate, which in turn drives the compressor section 1060. Discharge fluid may exit the exhaust section 1050.

As noted above, the hot, high pressure fluid passes through the turbine section 1010 during operation of the gas turbine engine 100. As the fluid flows through the turbine section 1010, the fluid passes between adjacent blades 1012 of the turbine 1014 causing the turbine 1014 to rotate. The rotating turbine 1014 may turn a shaft 1040 in a rotational direction D2, for example. The blades 1012 may rotate around an axis of rotation, which may correspond to a centerline C of the turbine 1014 in some examples.

The downstream direction D may be parallel with the centerline C and extend toward a rear end of the gas turbine engine 10. The upstream direction U may be a direction that is opposite the downstream direction D.

Figure 11:
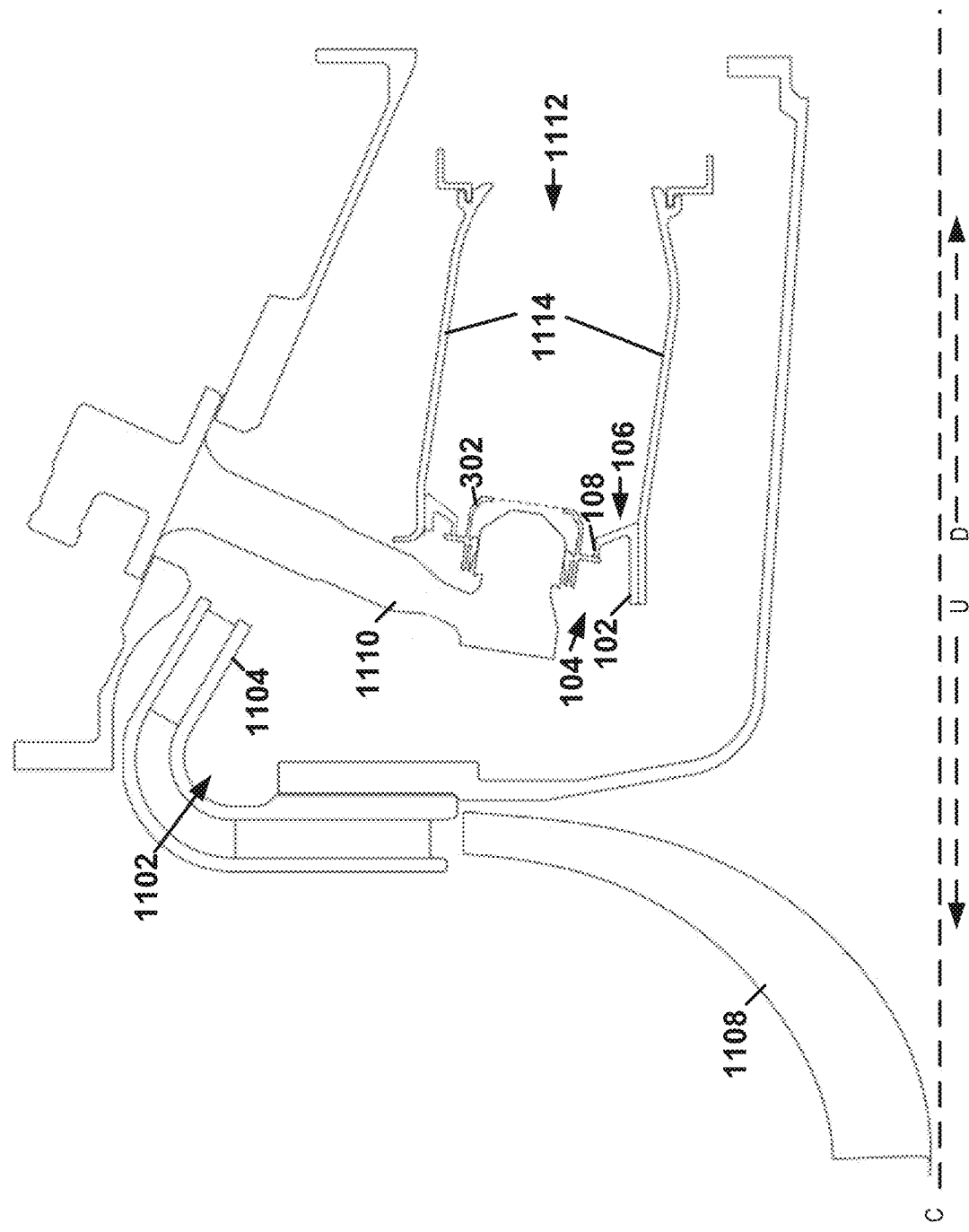
FIG. 11 illustrates fourth example of a combustor system.

FIG. 11 illustrates an example of a combustor system for a gas turbine engine. The first axial side 104 of the combustor dome 102 may receive air flowing in a compressor discharge cavity (CDP cavity) 1102. The CDP cavity 1102 may receive air from a diffusor 1104. The diffusor 1104 may receive compressed air from a compressor 1108 upstream from the combustor dome 102, relative to the centerline C.

In some examples, the swirler 302 may be positioned in the injection hole 108 of the combustor dome 102. The swirler 302 may receive at least a portion of a fuel injector assembly 1110. Alternatively or in addition the fuel injector assembly 1110 may be positioned proximate to the swirler 302. The fuel injector assembly 1110 may release fuel and/or a mixture of fuel and air. The swirler 302 may receive air from the CDP cavity and/or the fuel injector assembly 1110.

The second axial side 106 of the combustor dome 102 may at least partially define a combustion chamber 1112. The combustion chamber 1112 may be positioned downstream from the combustor dome 102, relative to the centerline C. The combustion chamber may receive a mixture of fuel and air from the swirler 302 and/or injection hole 108.

In some examples, a pair of combustor walls 1114 may at least partially define the combustion chamber 1112. The combustor walls 1114 may attach to the combustor dome 102. Alternatively or in addition, the combustor walls 1114 may extend away from the dome along the downstream direction D.

The system 100 and/or the combustor dome 102 may be implemented with additional, different, or fewer features. Each features may include additional, different, or fewer features. For example, the combustor dome may include the retainer 304 without the cooling inlets, cooling outlets, and/or the internal cooling channels. Alternatively or in addition, the combustor dome may include pockets, hoods, and/or a combination of pockets and hoods.

The combustor dome may include features that are integral to the combustor dome. As described herein, a first component is integral to a second component when the first component and the second component are each a separate portions of a unitary structure. In the examples described herein, the combustor dome 102 may be a unitary structure. The retainer 304, the raised outer surface 604, the recessed outer surface 606, the shadow surface 608, the hood 802, or any combination thereof may be respective portions of the combustor dome. The retainer 304, the raised outer surface 604, the recessed outer surface 606, the shadow surface 608, the hood 802, or any combination thereof may be formed as a portion of the combustor dome by way of ALM.

Figure 12:
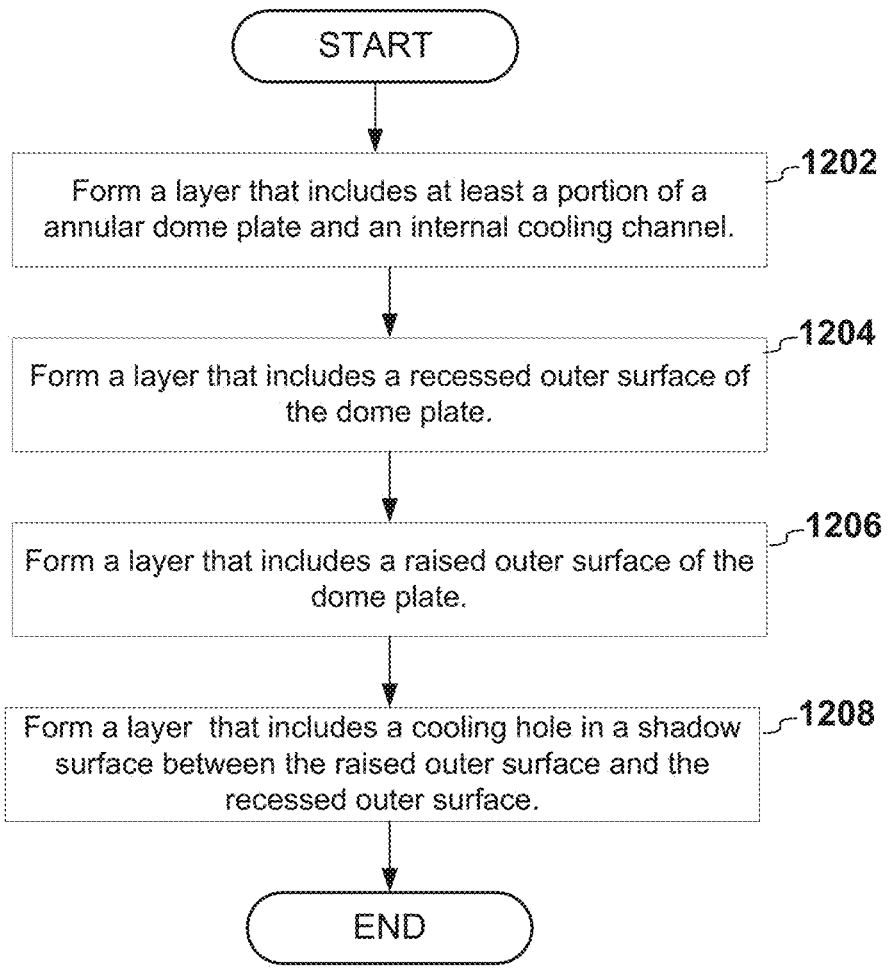
FIG. 12 illustrates a flow logic diagram for manufacturing a combustor system.

FIG. 12 illustrates a flow logic diagram for manufacturing the combustor system 100. By way of ALM, the combustor dome 102 may be formed by successively adding new layers of material to previous layers of solidified material.

To form the combustor dome 102, the additive layer manufacturing may form a layer that includes at least a portion of the dome plate 110 and an internal cooling channel (1202). For example, the combustor dome 102 may be formed by adding previously hardened layers to new layers. The new layers may define at least a portion of the internal cooling channel. In powder bed fusion, for example, an energy source, such as laser, may melt the powder around the internal cooling channel to define the internal cooling channel. When the melted powder hardens, the internal cooling channels may be filled with leftover unmelted powder. The powder may be removed to reveal the internal cooling channel.

The additive layer manufacturing may form a layer that includes a recessed outer surface 606 of the dome plate 110 (1204). For example, the additive layer manufacturing may form at least a portion of the pocket 702 described in reference to FIG. 7. Alternatively or in addition, the additive layer manufacturing may form at least portion of the outer surface of the combustor dome between the hoods described in reference to FIG. 8.

The additive layer manufacturing may form a layer that includes a raised outer surface 604 of the dome plate 110 (1206). For example, the raised outer surface 604 may be axially offset from the recessed outer surface 606, relative to the centerline C. Alternatively or in addition, the recessed may be closer to the first side 104 of the combustor dome 102 than the raised outer surface 606. Alternatively or in addition, the raised outer surface 604 may be closer to the combustion chamber than the recessed outer surface 606. In some examples, the raised outer surface 604 may include an outer surface of the dome plate 110 between pockets (see FIG. 7). Alternatively or in addition, the raised outer surface 604 may include the outer surface of the dome plate 110 along one or more hoods (see FIG. 8).

The additive layer manufacturing may form a layer that includes the cooling outlet 402 in a shadow surface 608 between the raised outer surface 604 and the recessed outer surface 606 (1208). For example, the layer may form at least a portion of the outlet 402 and/or at least apportion of the shadow surface 608.

The flow logic may include additional or fewer operations. For example, additive layer manufacturing may form a layer of the combustor dome 102 that includes at least a portion of the dome plate 110 that defines the injection hole 108. Alternatively or in addition, the manufacturing may form a layer of the combustor dome 102 that includes at least a portion of the retainer 304 that extends away from the dome plate 110. In some examples, the additive layer manufacturing may form a first layer of the combustor dome 102 that includes at least a portion of the hoods without the dome plate 110. The additive layer manufacturing may form a second layer of the combustor dome that includes at least a portion of the dome plate without the hoods.

The flow logic may include additional steps after the combustor dome is formed via ALM. For example, the flow logic may include assembly of the dome within the combustor section of the gas turbine engine. The assembly may involve attachment of the combustor wall 1114 to the combustor dome 102 (see FIG. 11). Alternatively or in addition, assembly may involve insertion of the swirler 302 into the injection hole 108 and moving in the retainer 304 to retain the swirler 302 in the injection hole 108 (see FIG. 3). Alternatively or in addition, the assembly may involve application of a thermal barrier coating to the second axial side 106 of the combustor dome 102.

The steps of the manufacturing may be performed in any order. For example, depending on the type of ALM, layers of the combustor dome 102 may be formed and fused together in various orders. In examples where powder bed fusion forms the combustor dome 102, powder may be melded and then hardened to successively add layers from the first axial side 104, to the second axial side 106. Alternatively, the dome may formed along a radial direction such that layers are successively added formed a radial outward and/or a radial inward direction to the centerline C.

In other examples, layers may be successively added along any direction to form the dome.

For example, the combustor dome 102 may be formed by powder bed fusion. Powder bed fusion may include a type of ALM in which a laser heats portions of a bed of power. The heated powder is hardened and fused into place to form a solid layer. A new layer of powder is added to the previously hardened layer(s), and the laser heats the new layer of powder. The three-dimensional component is formed by repeatedly adding powder to previously hardened layers and then heating the powder to form new hardened layers.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A combustor system comprising
an annular combustor dome arranged around a centerline for a gas turbine engine, the combustor dome comprising an annular dome plate having a first axial side and a second axial side opposite the first axial side, wherein a plurality of injection holes in the annular dome plate extend from the first axial side to the second axial side, the injection holes in fluid communication with a combustion chamber at least partially defined by the second axial side, the annular dome plate further comprising:
an internal cooling channel enclosed within the annular dome plate; and
a plurality of pockets located on the second axial side of the annular dome plate, wherein each of the pockets includes a side having a shadow surface and the shadow surface includes a corresponding cooling outlet in fluid communication with the internal cooling channel, the corresponding cooling outlet configured to release air from the internal cooling channel onto the second axial side of the annular dome plate.

2. The system of aspect 1, wherein the combustor dome comprises a plurality of layers fused together via powder bed fusion, wherein the shadow surface of each of the recesses is integral to the combustor dome.

3. The system of any of aspects 1 to 2, wherein the second axial side includes a thermal barrier coating, wherein each of at least one of the recesses includes a corresponding overhang configured to block the corresponding cooling outlet from receiving thermal barrier coating material during application of the thermal barrier coating.

4. The system of any of aspects 1 to 3, wherein the recessed outer surfaces and the shadow surfaces define respect pockets on the second axial side of the combustor dome.

5. The system of any of aspects 1 to 4, wherein at least one of the injection holes are configured to receive a swirler, wherein the combustor dome further comprises:
a retainer integral to the combustor dome, the retainer positioned adjacent to at least one of the injection holes, the retainer configured to retain the swirler in the injection hole.

6. The system of any of aspects 1 to 5, wherein the combustor dome defines a plurality of cooling inlets on the first axial side of the combustor dome, wherein the internal cooling channel is configured to convey air received from at least one of the cooling inlets.

7. The system of aspect 6, wherein the internal cooling channel comprises a circumferential cooling channel and a radial cooling channel, wherein the circumferential cooling channel is concentric with at least one of the injection holes and the radial cooling channel extends away from the at least one of the injections holes, wherein the circumferential cooing channel and the radial cooling channel intersect at a cooling junction, wherein the cooling junction is configured to receive air from the at least one of the cooling inlets.

8. A combustor dome comprising:
an annular dome plate arranged around a centerline for a gas turbine engine, the dome plate comprising a first axial side and a second axial side opposite the first axial side, wherein a plurality of injection holes extend from the first axial side to the second axial side of the dome plate, the combustor dome further comprising:
an internal cooling channel enclosed within the annular dome plate; and
a plurality of raised hoods located on the second axial side of the annular dome plate, wherein each of the raised hoods includes a side having a shadow surface and the shadow surface includes a corresponding cooling outlet in fluid communication with the internal cooling channel, the corresponding cooling outlet configured to release air from the internal cooling channel onto the second axial side of the annular dome plate.

9. The combustor dome of aspect 8, wherein the hoods extend away from an outer surface of the dome plate and an angle between the shadow surface and the outer surface is acute.

10. The combustor dome of any of aspects 8 to 9, wherein the hoods are integral to the dome plate.

11. The combustor dome of any of aspects 8 to 10, wherein the hoods and the dome plate comprise a plurality of layers melted together via additive layer manufacturing, wherein the plurality of layers comprise a first layer and a second layer on adjacent to the first layer, the first layer comprising a portion of at least one of the hoods and the second layer comprising the dome plate.

12. The combustor dome of any of aspects 8 to 11, wherein the dome plate further includes:
an inlet channel that extends from the first axial side toward a second axial side;
a plurality of internal channels defined inside of the dome plate between the first axial side and the second axial side, the internal cooling channels in fluid communication with the inlet channel, wherein air received by the inlet channel is split between the internal channels; and
an outlet channel that extends from at least one of the internal cooling channels toward the second axial side of the dome plate, wherein the outlet channel is configured to receive air from at least one of the internal cooling channels and convey the air out of dome plate on the second axial side.

13. The combustor dome of any of aspects 8 to 12, wherein the internal cooling channels comprise a first internal cooling channel and a second internal cooling channel, wherein the first internal cooling channel intersects the second internal cooling channel at a channel junction, wherein the channel junction is configured to receive air from the inlet channel.

14. The combustor dome of any of aspects 8 to 13, further comprising:
a retainer integral to the dome plate, wherein the retainer extends away from the dome plate and is positioned adjacent to at least one of the injection holes, the retainer configured to retain a swirler in the injection hole.

15. A method, comprising:
forming a layer of a combustor dome that includes at least a portion of an annular dome plate and an internal cooling channel defined by the annular dome pate between a first axial side and a second axial side of the combustor dome;
forming a layer of the combustor dome that includes a recessed outer surface of the dome plate on the second axial side of the combustor dome;
forming a layer of the combustor dome that includes a raised outer surface of the dome plate on the second axial side of the combustor dome;
forming a layer of the combustor dome that includes a shadow surface that extends between the raised outer surface and the recessed outer surface; and
forming a layer of the combustor dome that includes a cooling outlet hole defined by the shadow surface, the cooling outlet hole in fluid communication with the internal cooling channel.

16. The method of aspect 15, further comprising:
attaching a combustor wall to the combustor dome, wherein the second axial side of the combustor dome and the combustor wall at least partially defines a combustion chamber.

17. The method of any of aspects 15 to 16, further comprising:
forming a layer of the combustor dome that defines an injection hole for a swirler; and
forming a layer of the combustor dome that includes at least a portion of a retainer that extends away from the dome plate on the first axial side of the combustor dome.

18. The method of aspect 17, further comprising:
inserting a swirler into the injection hole; and
moving in the retainer to retain the swirler in the injection hole.

19. The method of any of aspects 15 to 18, further comprising:
applying a thermal barrier coating to the second axial side of the combustor dome.

20. The method of any of aspects 15 to 19, wherein forming the layer of the combustor dome that includes the portion of the annular dome plate and the internal cooling channel further comprises:
applying a heat source to a layer of powder to melt the at least a portion of layer of powder;
moving the heat source to allow melted powder to cool; and
removing unmelted powder from the dome plate to reveal the internal cooling channel.

21. A combustor dome comprising:
an annular dome plate arranged around a centerline for a gas turbine engine, the dome plate comprising a first axial side and a second axial side opposite the first axial side, wherein a plurality of injection holes extend from the first axial side to the second axial side of the dome plate, the injection holes configured to receive a swirler, the combustor dome further comprising:
a retainer configured to retain the swirler in at least one of the injection holes, the retainer integral to the dome plate and positioned on the first axial side of the dome plate, wherein the retainer extends away from a surface of the dome plate and over the at least one of the injection holes.

What is claimed is:

1. A combustor system comprising
an annular combustor dome arranged around a centerline for a gas turbine engine, the combustor dome comprising a plurality of recessed outer surfaces, a raised outer surface, and an annular dome plate having a first axial side and a second axial side opposite the first axial side, wherein a plurality of injection holes in the annular dome plate extend from the first axial side to the second axial side, the injection holes in fluid communication with a combustion chamber at least partially defined by the second axial side, the annular dome plate further comprising:
plurality of internal cooling channels enclosed within the annular dome plate, wherein the internal cooling channels comprise a plurality of circumferential cooling channels and a radial cooling channel, wherein the plurality of circumferential cooling channels are concentric with at least one of the injection holes, each one of the circumferential cooling channels positioned at a different radial distance from the injection hole, and wherein the radial cooling channel extends away from the at least one of the injection holes, wherein the plurality of circumferential cooling channels and the radial cooling channel intersect at a plurality of cooling junctions; and
a plurality of pockets located on the second axial side of the annular dome plate, wherein each one of the pockets includes a side having a shadow surface and the shadow surface includes a corresponding cooling outlet in fluid communication with the internal cooling channels, the corresponding cooling outlet configured to release air from the internal cooling channel onto the second axial side of the annular dome plate,
wherein the plurality of recessed outer surfaces of the combustor dome and the shadow surfaces define the pockets on the second axial side of the combustor dome, wherein each of the shadow surfaces is defined by a respective one of the recessed outer surfaces of the combustor dome and the raised outer surface of the combustor dome, wherein the raised outer surface of the combustor dome includes an outer surface of the combustor dome between two or more of the pockets, and wherein the pockets are uncovered recesses along the outer surface of the combustor dome.

2. The system of claim 1, wherein the combustor dome comprises a plurality of layers fused together via powder bed fusion, wherein the shadow surface of each one of the pockets is integral to the combustor dome.

3. The system of claim 2, wherein the second axial side includes a thermal barrier coating, wherein each of at least one of the pockets includes a corresponding overhang configured to block the corresponding cooling outlet from receiving thermal barrier coating material during application of the thermal barrier coating.

4. The system of claim 1, wherein at least one of the injection holes are configured to receive a swirler, wherein the combustor dome further comprises:
a retainer integral to the combustor dome, the retainer positioned adjacent to at least one of the injection holes, the retainer configured to retain the swirler in the at least one injection hole.

5. The system of claim 1, wherein the combustor dome defines a plurality of cooling inlets on the first axial side of the combustor dome, wherein the internal cooling channels are configured to convey air received from at least one of the cooling inlets.

6. The system of claim 5, wherein the injection holes are configured to receive a fuel injector and/or a swirler, wherein at least one of the cooling junctions are configured to receive air from the at least one of the cooling inlets.

7. A combustor dome comprising:
an annular dome plate arranged around a centerline for a gas turbine engine, the annular dome plate comprising a first axial side and a second axial side opposite the first axial side, wherein a plurality of injection holes extend from the first axial side to the second axial side of the annular dome plate, wherein the injection holes are configured to receive a fuel injector and/or a swirler, the annular dome plate further comprising:
a plurality of internal cooling channels enclosed within the annular dome plate, wherein the internal cooling channels comprise a plurality of circumferential cooling channels and a radial cooling channel, wherein the plurality of circumferential cooling channels are concentric with at least one of the injection holes, each one of the circumferential cooling channels positioned at a different radial distance from the injection hole, and wherein the radial cooling channel extends away from the at least one of the injection holes, wherein the plurality of circumferential cooling channels and the radial cooling channel intersect at a plurality of cooling junctions;
a plurality of cooling inlets defined by the annular dome plate, the cooling inlets located on the first axial side, wherein the internal cooling channels are configured to convey air received from at least one of the cooling inlets, wherein the cooling junction is configured to receive air from the at least one of the cooling inlets; and
a plurality of raised hoods located on the second axial side of the annular dome plate, wherein each of the raised hoods includes a side having a shadow surface and the shadow surface includes a corresponding cooling outlet in fluid communication with the internal cooling channels, the corresponding cooling outlet configured to release air from the internal cooling channels onto the second axial side of the annular dome plate.

8. The combustor dome of claim 7, wherein the raised hoods extend away from an outer surface of the annular dome plate and an angle between the shadow surface and the outer surface is acute.

9. The combustor dome of claim 7, wherein the hoods are integral to the annular dome plate.

10. The combustor dome of claim 7, wherein the hoods and the annular dome plate comprise a plurality of layers melted together via additive layer manufacturing, wherein the plurality of layers comprise a first layer and a second layer adjacent to the first layer, the first layer comprising a portion of at least one of the hoods and the second layer comprising the annular dome plate.

11. The combustor dome of claim 7, wherein the annular dome plate further includes:
an inlet channel that extends from the first axial side toward the second axial side,
wherein the internal cooling channels defined inside of the annular dome plate between the first axial side and the second axial side, the internal cooling channels in fluid communication with the inlet channel, wherein air received by the inlet channel is split between the internal cooling channels; and
an outlet channel that extends from at least one of the internal cooling channels toward the second axial side of the annular dome plate, wherein the outlet channel is configured to receive air from at least one of the internal cooling channels and convey the air out of annular dome plate on the second axial side.

12. The combustor dome of claim 11, wherein the internal cooling channels comprise a first internal cooling channel and a second internal cooling channel, wherein the first internal cooling channel intersects the second internal cooling channel at a channel junction, wherein the channel junction is configured to receive air from the inlet channel.

13. The combustor dome of claim 7, further comprising:
a retainer integral to the annular dome plate, wherein the retainer extends away from the annular dome plate and is positioned adjacent to at least one of the injection holes, the retainer configured to retain a swirler in the at least one injection hole.

14. A method, comprising:
forming multiple layers of a combustor dome that define a plurality of injection holes, wherein the injection holes are configured to receive a fuel injector and/or a swirler;
forming a layer of a combustor dome that includes at least a portion of an annular dome plate and plurality of internal cooling channels defined by the annular dome plate between a first axial side and a second axial side of the combustor dome;
forming a plurality of circumferential cooling channels and a radial cooling channel, the circumferential cooling channels and the radial cooling channel included in the internal cooling channels, wherein the circumferential cooling channels are concentric with at least one of the injection holes and surrounds the at least one injection hole, each one of the circumferential cooling channels positioned at a different radial distance from the injection hole, and wherein the radial cooling channel extends away from the at least one injection hole, wherein the plurality of circumferential cooling channels and the radial cooling channel intersect at a plurality of cooling junctions;
forming a layer of the combustor dome that includes a recessed outer surface of the annular dome plate on the second axial side of the combustor dome;
forming a layer of the combustor dome that includes a raised outer surface of the annular dome plate on the second axial side of the combustor dome;
forming a layer of the combustor dome that includes a shadow surface that extends between the raised outer surface and the recessed outer surface;
forming a layer of the combustor dome that includes a cooling outlet hole defined by the shadow surface, the cooling outlet hole in fluid communication with the internal cooling channel.

15. The method of claim 14, further comprising:
attaching a combustor wall to the combustor dome, wherein the second axial side of the combustor dome and the combustor wall at least partially defines a combustion chamber.

16. The method of claim 14, further comprising:
forming a layer of the combustor dome that defines an injection hole for a swirler; and
forming a layer of the combustor dome that includes at least a portion of a retainer that extends away from the annular dome plate on the first axial side of the combustor dome.

17. The method of claim 16, further comprising:
inserting a swirler into the injection hole; and
moving in the retainer to retain the swirler in the injection hole.

18. The method of claim 14, further comprising:
applying a thermal barrier coating to the second axial side of the combustor dome.

19. The method of claim 14, wherein forming the layer of the combustor dome that includes the portion of the annular dome plate and the plurality of internal cooling channels further comprises:
applying a heat source to a layer of powder to melt the at least a portion of layer of powder;
moving the heat source to allow melted powder to cool; and
removing unmelted powder from the annular dome plate to reveal plurality of the internal cooling channels.

20. A combustor dome comprising:
an annular dome plate arranged around a centerline for a gas turbine engine, the dome plate comprising a first axial side and a second axial side opposite the first axial side, wherein a plurality of injection holes extend from the first axial side to the second axial side of the dome plate, the injection holes configured to receive a swirler, wherein a flange extending along a perimeter of the injection hole extends away from the first axial side of the dome plate, the combustor dome further comprising:
a retainer configured to retain the swirler in at least one of the injection holes, wherein the retainer is integral to the dome plate and extending from the first axial side of the dome plate, wherein the retainer extends away from the first axial side of the dome plate adjacent to the flange and over an opening in the first axial side of the dome plate defined by the at least one of the injection holes.

* * * * *